United States Patent
Yoshida

(10) Patent No.: US 9,569,621 B2
(45) Date of Patent: Feb. 14, 2017

(54) INFORMATION PROCESSING APPARATUS AND INFORMATION PROCESSING APPARATUS STARTUP CONTROL METHOD

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 982 days.

(21) Appl. No.: 13/666,162

(22) Filed: Nov. 1, 2012

(65) Prior Publication Data

US 2013/0139270 A1    May 30, 2013

(30) Foreign Application Priority Data

Nov. 30, 2011    (JP) .................................. 2011-262968

(51) Int. Cl.
G06F 21/57    (2013.01)
G06F 21/50    (2013.01)
G06F 21/51    (2013.01)

(52) U.S. Cl.
CPC ............. *G06F 21/575* (2013.01); *G06F 21/50* (2013.01); *G06F 21/51* (2013.01)

(58) Field of Classification Search
None
See application file for complete search history.

(56) References Cited

U.S. PATENT DOCUMENTS

| | | | |
|---|---|---|---|
| 6,564,326 B2 * | 5/2003 | Helbig, Sr. ..................... 726/34 |
| 7,194,623 B1 * | 3/2007 | Proudler ............... G06F 21/552 710/261 |
| 8,146,167 B2 * | 3/2012 | Inooka et al. .................. 726/27 |
| 8,181,032 B2 * | 5/2012 | Prakash et al. ............... 713/186 |
| 2006/0179487 A1 * | 8/2006 | Hatakeyama ................... 726/26 |
| 2008/0222407 A1 * | 9/2008 | Carpenter et al. ............... 713/2 |
| 2009/0100061 A1 | 4/2009 | Yoshida |
| 2009/0228487 A1 | 9/2009 | Yoshida |
| 2011/0044451 A1 | 2/2011 | Anzai et al. |
| 2011/0187642 A1 * | 8/2011 | Faith et al. .................... 345/158 |
| 2012/0018511 A1 * | 1/2012 | Hammad ....................... 235/380 |
| 2012/0031969 A1 * | 2/2012 | Hammad ....................... 235/380 |

FOREIGN PATENT DOCUMENTS

| | | |
|---|---|---|
| JP | 2008-234220 | 10/2008 |
| JP | 2010-146110 | 7/2010 |

* cited by examiner

*Primary Examiner* — Azizul Choudhury
(74) *Attorney, Agent, or Firm* — Harness, Dickey & Pierce, P.L.C.

(57) ABSTRACT

An information processing apparatus includes a first processor that is connected to an input/output device and is configured to execute a program for controlling an apparatus including the input/output device, and a second processor that is connected to an external network and is configured to execute a program for establishing communication via the external network, wherein when starting the information processing apparatus, the second processor verifies an integrity of the program to be executed by the first processor and starts the first processor when the integrity of the program to be executed by the first processor is verified, and when the integrity of the program to be executed by the first processor is not verified, the second processor issues a problem notification without using a user interface of the first processor.

9 Claims, 19 Drawing Sheets

FIG.11

| VALIDITY | PROBLEM NOTIFICATION DESTINATION |
|---|---|
| YES | 123.123.123.123 |
| NO | 123.123.123.122 |
| NO | 123.123.123.121 |

| VALIDITY | NOTIFICATION DESTINATION OR OUTPUT MEANS | 30F |
|---|---|---|
| YES | CALL CENTER NOTIFICATION | |
| NO | IC DEVICE WRITING | |
| ... | ... | |

INFORMATION PROCESSING APPARATUS AND INFORMATION PROCESSING APPARATUS STARTUP CONTROL METHOD

BACKGROUND OF THE INVENTION

1. Field of the Invention

The disclosures herein generally relate to an information processing apparatus and a method of controlling startup operations of the information processing apparatus.

2. Description of the Related Art

Conventionally, when starting an information processing apparatus such as a built-in computer of an electronic device, a personal computer, or a server apparatus, an integrity verification process is performed to verify that the program to be executed is an appropriate program that has not been tampered with or corrupted by untrustworthy parties, for example.

Japanese Laid-Open Patent Publication No. 2010-146110 discloses an information processing apparatus that includes program reading means for reading each program into a main storage device from a recording medium, program validating means for determining the validity of each program read into the main storage device, and program executing means for executing each program that has been determined to be valid.

However, the above disclosed apparatus does not contemplate sending a notification externally when the integrity of a program is not verified.

SUMMARY OF THE INVENTION

It is a general object of at least one embodiment of the present invention to provide an information processing apparatus that substantially obviates one or more problems caused by the limitations and disadvantages of the related art.

In one embodiment of the present invention, an information processing apparatus includes a first processor that is connected to an input/output device and is configured to execute a program for controlling an apparatus including the input/output device, and a second processor that is connected to an external network and is configured to execute a program for establishing communication via the external network, wherein when starting the information processing apparatus, the second processor verifies an integrity of the program to be executed by the first processor and starts the first processor when the integrity of the program to be executed by the first processor is verified, and when the integrity of the program to be executed by the first processor is not verified, the second processor issues a problem notification without using a user interface of the first processor.

According to an aspect of the present invention, an information processing apparatus may be capable of reliably sending notification of a verification problem when the integrity of a program to be executed by an apparatus controlling processor is not verified.

BRIEF DESCRIPTION OF THE DRAWINGS

Other objects and further features of embodiments will be apparent from the following detailed description when read in conjunction with the accompanying drawings, in which:

FIG. 11 shows an exemplary data structure of a notification destination validity table used in the fifth embodiment;

FIG. 19 shows an exemplary data structure of a notification destination validity table according to a modified embodiment.

DESCRIPTION OF THE PREFERRED EMBODIMENTS

In the following, embodiments of the present invention are described with reference to the accompanying drawings.

First Embodiment

In the following, an information processing apparatus 1 according to a first embodiment of the present invention and a method of controlling startup operations of the information processing apparatus 1 are described.

Figure 1:
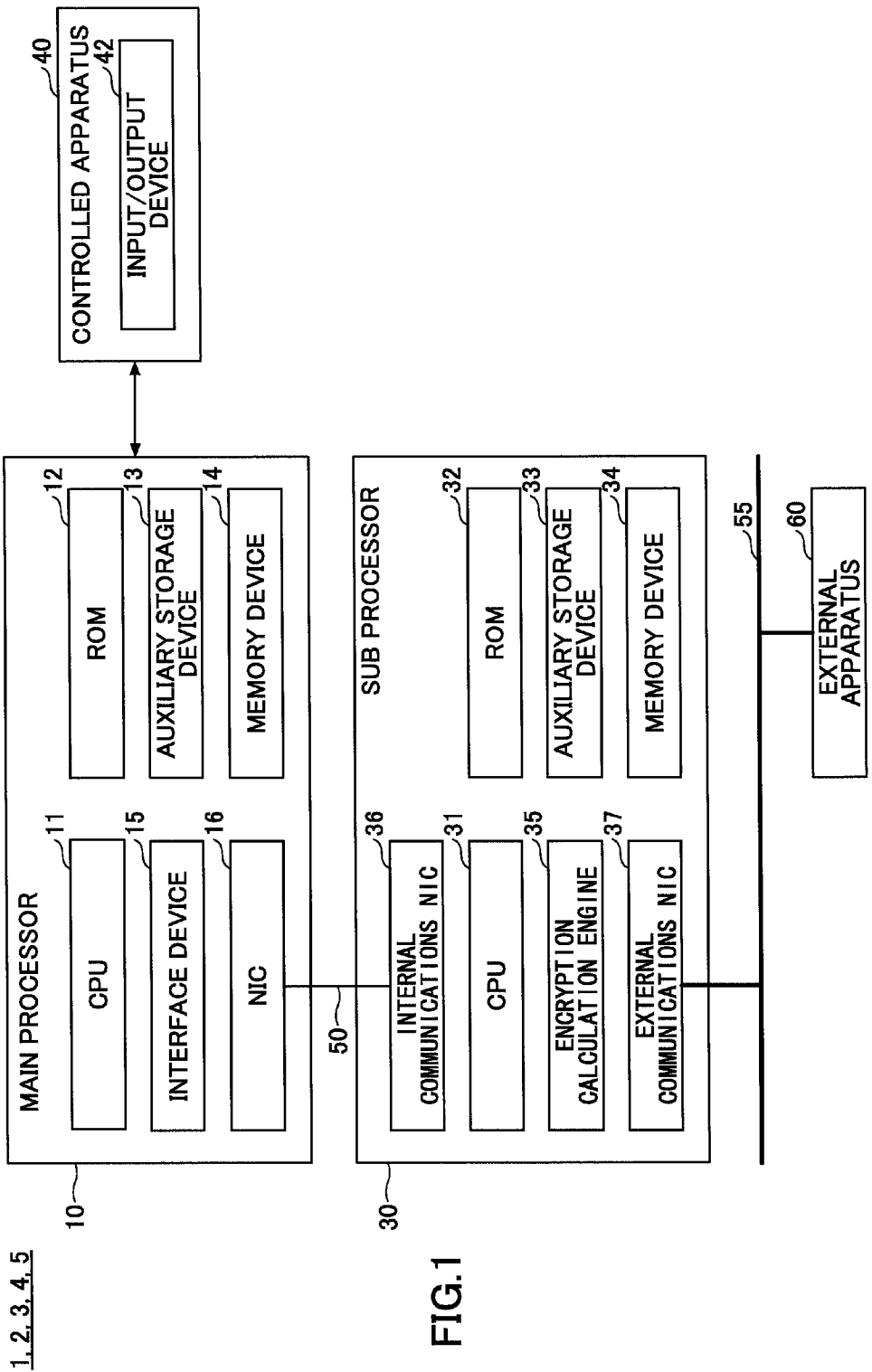
FIG. 1 is a block diagram showing an exemplary hardware configuration of an information processing apparatus according to a first embodiment of the present invention.

FIG. 1 is a block diagram showing an exemplary hardware configuration of the information processing apparatus 1 according to the first embodiment. The information processing apparatus 1 includes a main processor 10 and a sub processor 30.

The main processor 10 includes a CPU 11, a ROM (Read-Only Memory) 12, an auxiliary storage device 13, a memory device 14, an interface device 15, and a NIC (Network Interface Card) 16, for example.

The CPU 11 may include a program counter, a command decoder, various computing units, a LSU (Load Store Unit), a general-purpose register, and a cache memory, for example. The ROM 12 may be a mask ROM that stores startup control programs and data including BIOS (Basic Input/Output System), for example. The auxiliary storage device may be a flash memory, an EEPROM (Electrically Erasable and Programmable Read-Only Memory), or a HDD (Hard Disk Drive) that stores data and programs to be executed by the CPU 11, for example. The memory device 14 may be a RAM (Random Access Memory) that functions as a working memory to be used by the CPU 11, for example.

The main processor 10 is connected to a controlled apparatus 40 that includes an input/output device 42 such as a display panel and a LED (light emitting diode), for example. The controlled apparatus 40 may include other devices such as a projection device, for example.

The NIC 16 exchanges information with an internal communications NIC 36 of the sub processor 30 via an internal bus 50 to enable information exchange between the main processor 10 and the sub processor 30. For example, the USB (Universal Serial Bus) may be used as the communication protocol for enabling such information exchange between the processors.

The sub processor 30 includes a CPU 31, a ROM 32, an auxiliary storage device 33, a memory device 34, an encryption calculation engine 35, the internal communications NIC 36, and an external communications NIC 37, for example. It is noted that features of the CPU 31, the ROM 32, and the memory device 34 may be identical to the CPU 11, the ROM 12, and the memory device 14 of the main processor 10 so that their descriptions are omitted. In a preferred embodiment, at least a portion of the auxiliary storage device 33 is arranged to be tamper-resistant by being embedded within a chip to prevent the wiring from being altered or blocking a write access line, for example.

The encryption calculation engine 35 may be directed by the CPU 31 to perform encryption/decryption processes based on SSL (Secure Socket Layer) when communication is established with an external apparatus 60, for example. The encryption calculation engine 35 may also perform an integrity verification process, which is described below.

The external communications NIC 37 establishes communication with the external apparatus 60 via an external network 55. For example, the external network 55 may be configured to enable packet communication based on the TCP/IP (Transmission Control Protocol/Internet Protocol).

The external apparatus 60 may be any device having communication means such as a personal computer or a server apparatus. The external apparatus 60 may be a single device or plural devices.

In one embodiment, the external apparatus 60 may be configured to send a control signal for controlling the controlled apparatus 40 to the information processing apparatus 1. For example, in the case where the controlled apparatus 40 includes a projection device, the external apparatus 60 may send image data to the information processing apparatus 1, the sub processor 30 may receive the image data and send the image data to the main processor 10, and the main processor 10 may control display operations of the controlled apparatus 40 based on the image data obtained from the sub processor 30.

It is noted that in some embodiments, the main processor 10 and/or the sub processor 30 may not need one or more of the CPU 11/31, the auxiliary storage device 13/33, and/or the NICs 16/36/37. In such cases, these units may be excluded or replaced as is necessary or appropriate.

Figure 2:
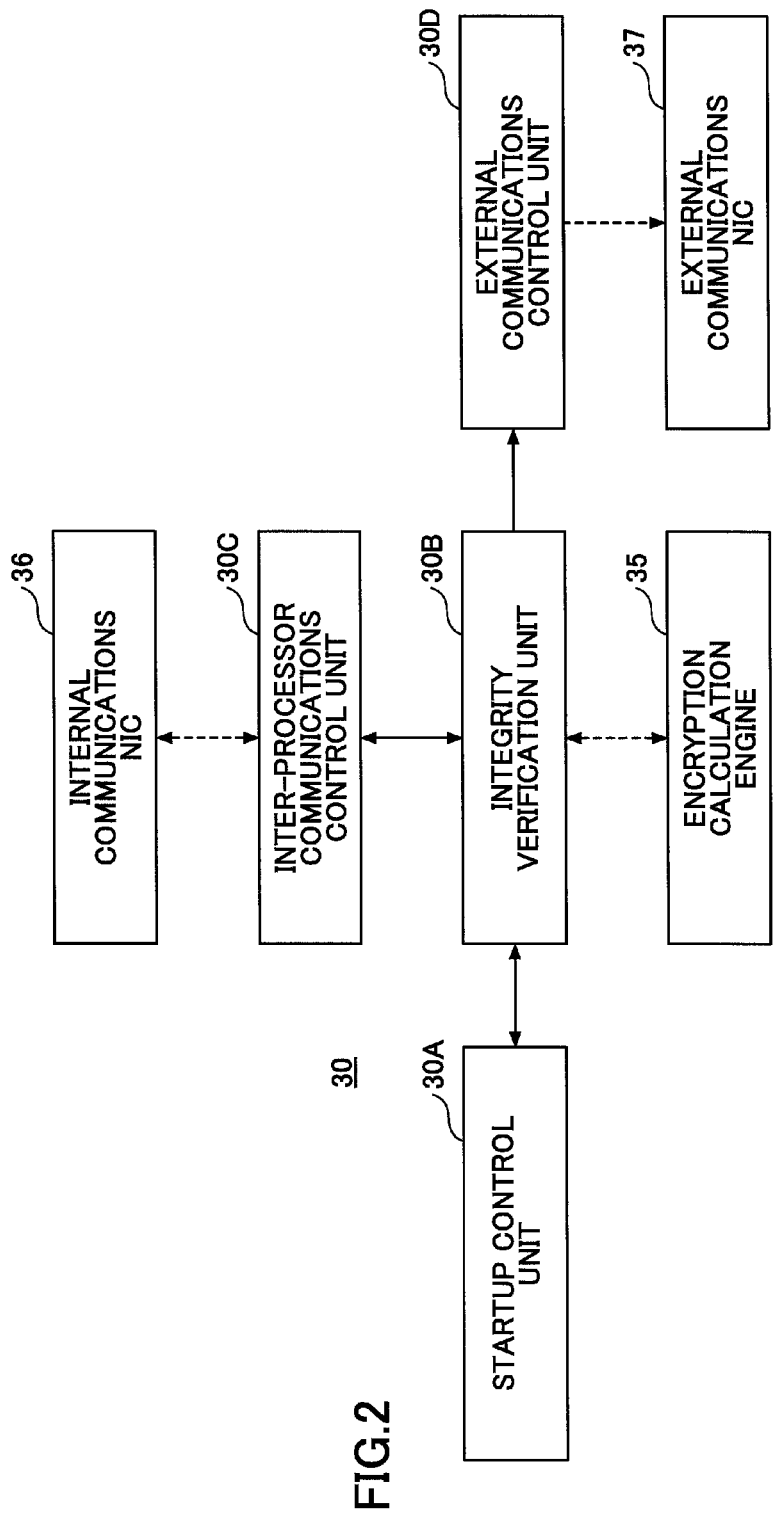
FIG. 2 is a block diagram showing an exemplary functional configuration of a sub processor when starting the information processing apparatus of the first embodiment.

FIG. 2 is a block diagram showing an exemplary functional configuration of the sub processor 30 when starting the information processing apparatus 1 (e.g., when the power is turned on or when the system is restarted). As is shown in FIG. 2, a startup control unit 30A including the BIOS, an integrity verification unit 30B, an inter-processor communications control unit 30C, and an external communications control unit 30D are run on the sub processor 30 when starting the information processing apparatus 1.

In the following, process steps for starting the information processing apparatus 1 are described.

Figure 3:
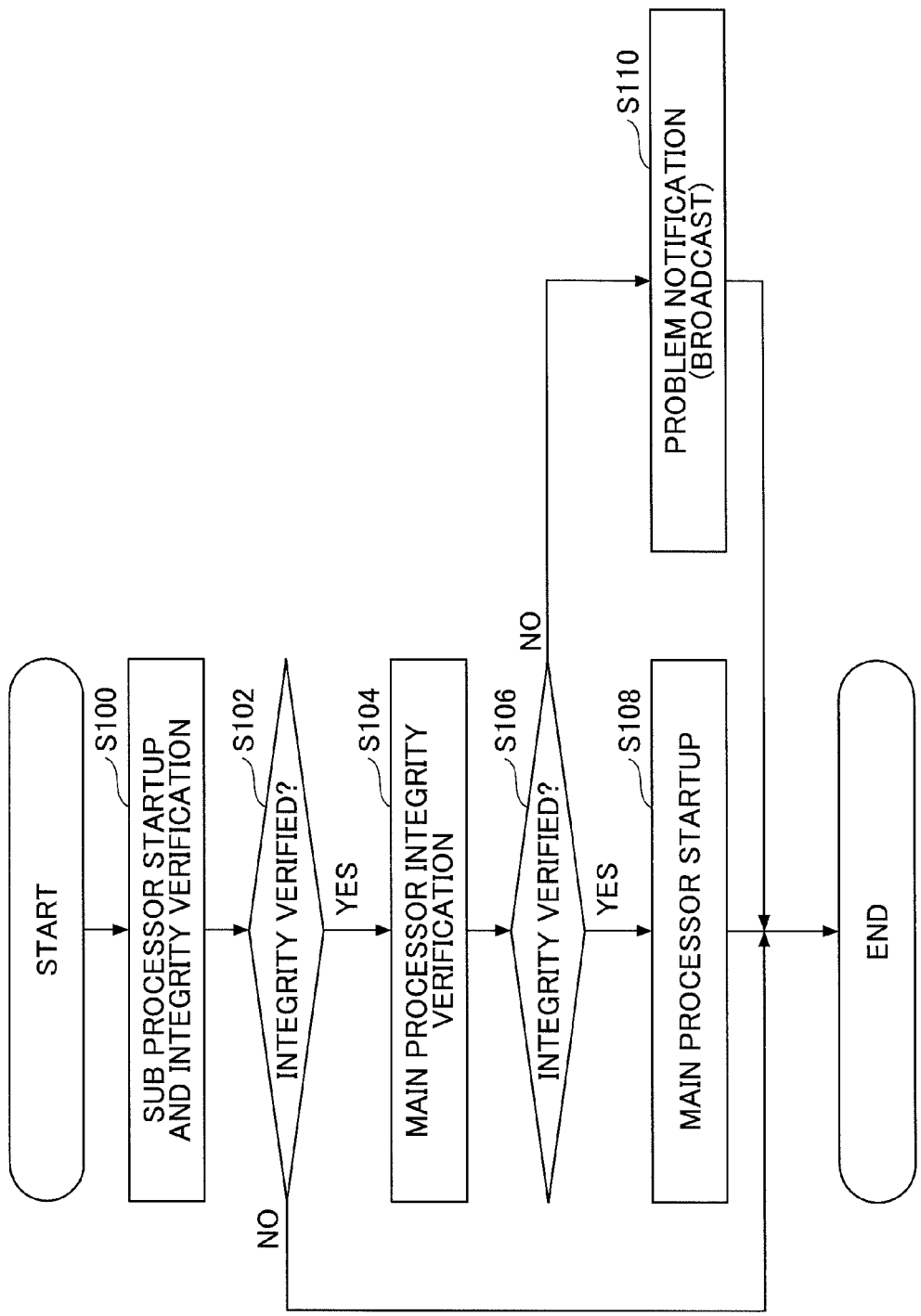
FIG. 3 is a flowchart showing exemplary process steps executed by the sub processor when starting the information processing apparatus of the first embodiment.

FIG. 3 is a flowchart showing exemplary process steps executed by the sub processor 30 when starting the information processing apparatus 1.

First, the sub processor 30 starts up when the startup control unit 30A is started, and the startup control unit 30A instructs the integrity verification unit 30B to perform integrity verification of programs that are to be executed by the sub processor 30 itself (S100). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S102).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S104). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S106).

When the integrity of the programs and data stored in the auxiliary storage device 13 has been verified, the startup control unit 30A sends a signal to a startup control unit (not shown) of the main processor 10 to start the main processor 10 (S108). In this way, the main processor 10 may start performing normal operations.

On the other hand, when the integrity of the programs and data stored in the auxiliary storage device 13 has not been verified, the external communications control unit 30D may broadcast a verification problem notification to the external apparatus 60 indicating that a verification problem has occurred in the programs to be executed by the main processor 10 (S110).

In this way, when the integrity of the programs to be executed by the main processor 10 corresponding to the apparatus controlling processor is not verified, the external apparatus 60 may be notified of such a verification problem in a reliable manner.

It is noted that in the information processing apparatus 1 of the present embodiment, the notification of the verification problem is sent using the external network 55, which is connected to the sub processor 30, as opposed to using a device connected to the main processor 10.

In this way, the notification of the verification problem may be sent to the external apparatus 60 in a more reliable manner compared to a case in which the main processor 10 controls the verification problem notification. That is, when a program for notifying a verification problem is to be executed by the main processor 10, the program may be disabled when a verification problem occurs and no verification problem notification may be issued, for example.

Also, the sub processor 30 does not have to understand device details such as the configuration and/or the IP address of the controlled apparatus 40, which is connected to the main processor 10, so that the sub processor 30 may accommodate main processors 10 of various specifications. In this way, apparatus compatibility may be improved, for example.

According to an aspect of the present embodiment, when the integrity of the programs to be executed by the main processor 10 corresponding to the apparatus control processor is not verified, a notification of the verification problem may be reliably sent to the external apparatus 60.

Second Embodiment

In the following, an information processing apparatus 2 according to a second embodiment of the present invention and a method of controlling startup operations of the information processing apparatus 2 are described.

It is noted that hardware components of the information processing apparatus 2 according to the second embodiment may be identical to those of the information processing apparatus 1 according to the first embodiment shown in FIG. 1 so that they are given the same reference numerals and their descriptions are omitted. Other features of the present embodiment that may be identical to those of the first embodiment are also given the same reference numerals.

Figure 4:
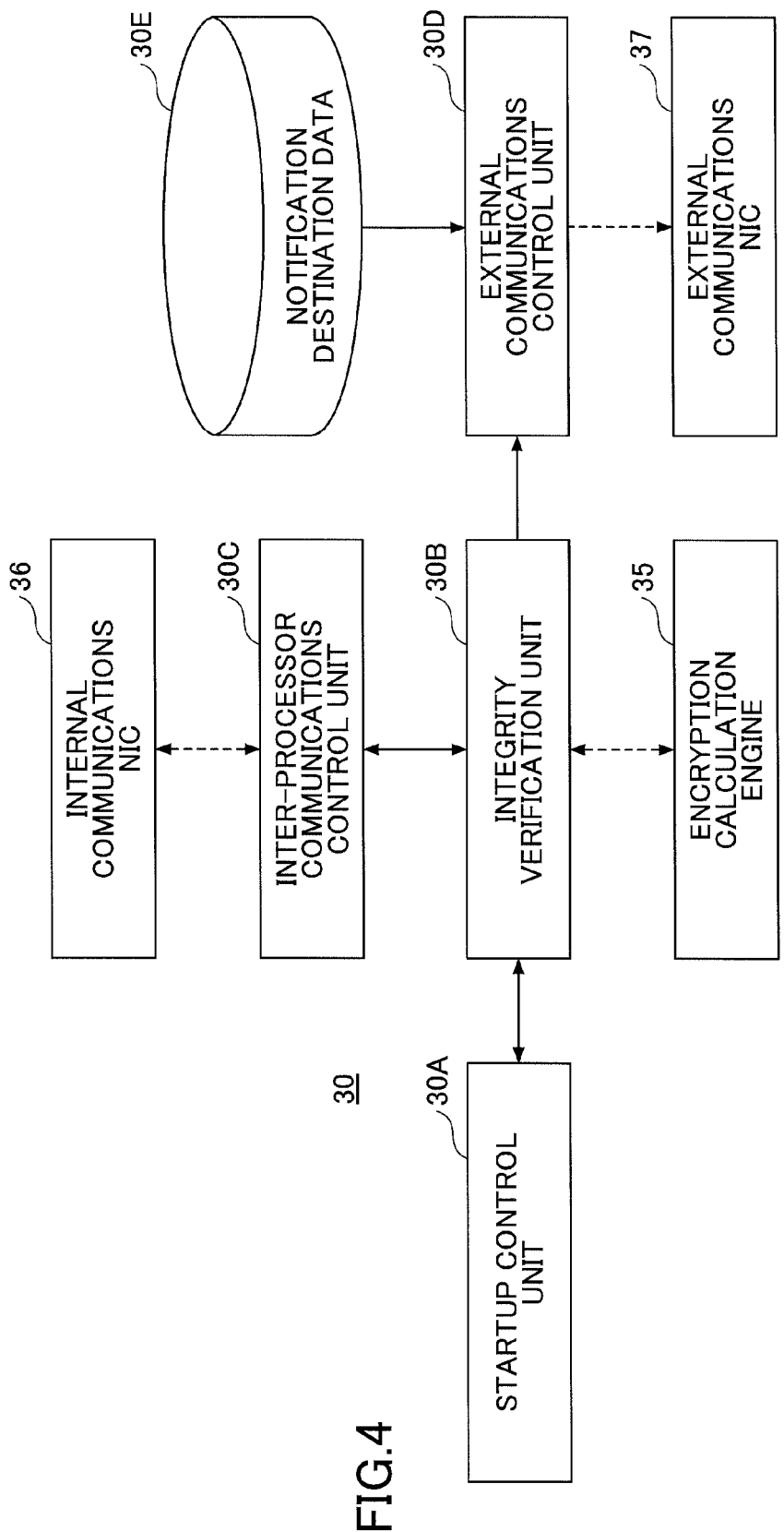
FIG. 4 is a block diagram showing an exemplary functional configuration of the sub processor when starting an information processing apparatus according to a second embodiment of the present invention.

FIG. 4 is a block diagram showing an exemplary functional configuration of the sub processor 30 when starting the information processing apparatus 2. As is shown in FIG. 4, the startup control unit 30A including the BIOS, the integrity verification unit 30B, the inter-processor communications control unit 30C, and the external communications control unit 30D are run on the sub processor 30 when starting the information processing apparatus 2. When sending a verification problem notification, the external communications control unit 30D refers to notification destination data 30E that designates a notification destination to which the verification problem notification should be sent.

Figure 5:
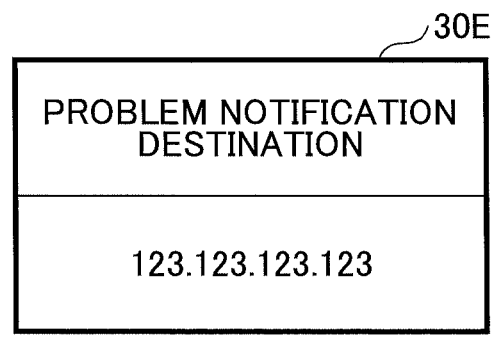
FIG. 5 is a table showing an exemplary data structure of notification destination data used in the second embodiment.

FIG. 5 shows an exemplary data structure of the notification destination data 30E used in the present embodiment. The notification destination data 30E may designate an IP address of the external apparatus 60 corresponding to the notification destination of the verification problem notification, for example. The notification destination data 30E may be stored in the auxiliary storage device 33, for example, and may be registered and altered by a user of the information processing apparatus 2. For example, the communication history of the external apparatus 60 with the external network 55 may be obtained from the external communications NIC 37 and a list of notification destination candidates may be displayed at the input/output device 42. The user may select a notification destination from this list of notification destination candidates and the selected notification destination may be stored as the notification destination data 30E.

In the following, process steps for starting the information processing apparatus 2 are described.

Figure 6:
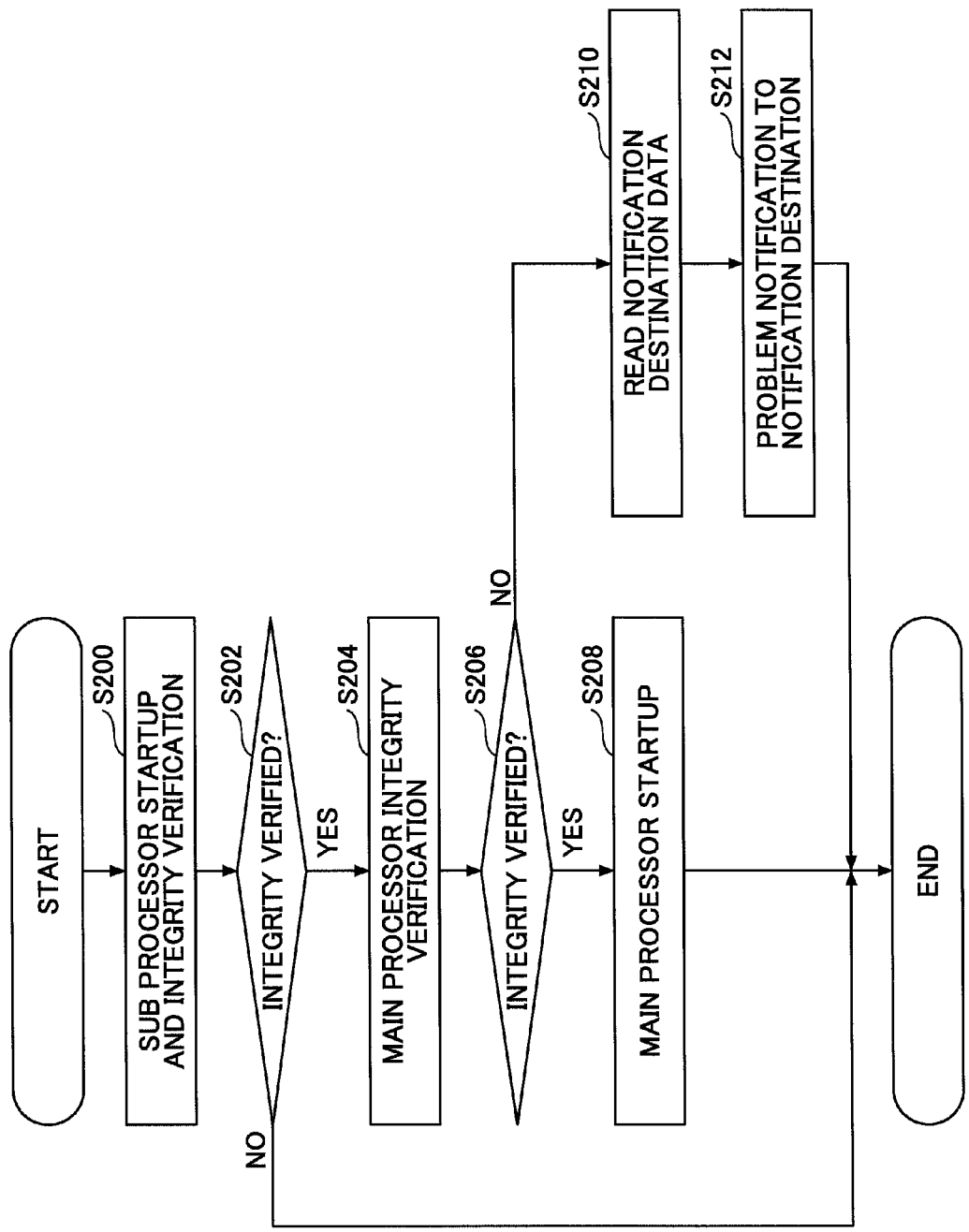
FIG. 6 is a flowchart showing exemplary process steps executed by the sub processor when starting the information processing apparatus of the second embodiment.

FIG. 6 is a flowchart showing exemplary process steps executed by the sub processor 30 when starting the information processing apparatus 2.

First, the sub processor 30 starts up when the startup control unit 30A is started, and the startup control unit 30A instructs the integrity verification unit 30B to perform integrity verification of programs that are to be executed by the sub processor 30 itself (S200). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S202).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S204). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S206).

When the integrity of the programs and data stored in the auxiliary storage device 13 has been verified, the startup control unit 30A sends a signal to a startup control unit (not shown) of the main processor 10 to start the main processor 10 (S208). In this way, the main processor 10 may start performing normal operations.

On the other hand, when the integrity of the programs and data stored in the auxiliary storage device 13 has not been verified, the external communications control unit 30D reads the notification destination data 30E (S210) and sends a notification indicating that a verification problem has occurred in the programs to be executed by the main processor 10 to the external apparatus 60 that is designated as the notification destination by the notification destination data 30E (S212).

In this way, when the integrity of the programs to be executed by the main processor 10 corresponding to the apparatus controlling processor is not verified, a verification problem notification may be sent to the external apparatus 60 as in the first embodiment.

According to an aspect of the present embodiment, by designating a notification destination of the verification problem notification, the communication load of the external network 55 may be reduced.

It is noted that the external apparatus 60 that is designated as the notification destination of the verification problem notification may be an ordinary computer or an operator terminal operated by a call center of the manufacturer of the information processing apparatus 2, for example.

In the latter case, the notification destination data 30E may be stored in the ROM 32 when the information processing apparatus 2 is shipped from the manufacturer, for example. In this way, a service staff member at the call center may promptly respond to the problem by repairing or replacing the information processing apparatus 2 as is necessary so that the waiting time before the information processing apparatus 2 and the controlled apparatus 40 may be used again may be reduced, for example. Additionally, the user may be relieved of the burden of having to request a repair/replacement after becoming aware of the verification problem, for example.

It is noted that the notification destination data 30E is not limited one of the user-registered notification destination or the notification destination pre-registered in the ROM 32 described above. That is, in some embodiments, the notification destination data 30E may include both the user-designated notification destination and the notification destination pre-registered in the ROM 32.

Third Embodiment

In the following, an information processing apparatus 3 according to a third embodiment of the present invention and a method of controlling startup operations of the information processing apparatus 3 are described.

It is noted that hardware components of the information processing apparatus 3 according to the third embodiment may be identical to those of the information processing apparatus 1 according to the first embodiment shown in FIG. 1 so that they are given the same reference numerals and their descriptions are omitted.

Also, the functional features of the sub processor 30 when starting the information processing apparatus 3 may be identical to those of the information processing apparatus 2 according to the second embodiment shown in FIGS. 4 and 5 so that they are given the same reference numerals and their descriptions are omitted. The notification destination data 30E used in the present embodiment may be stored in the ROM 32 and/or the auxiliary storage device 33 as in the second embodiment, and the notification destination data 30E that is stored in the auxiliary storage device 33 may be registered and altered by the user of the information processing apparatus 3.

In the following, process steps for starting the information processing apparatus 3 are described.

Figure 7:
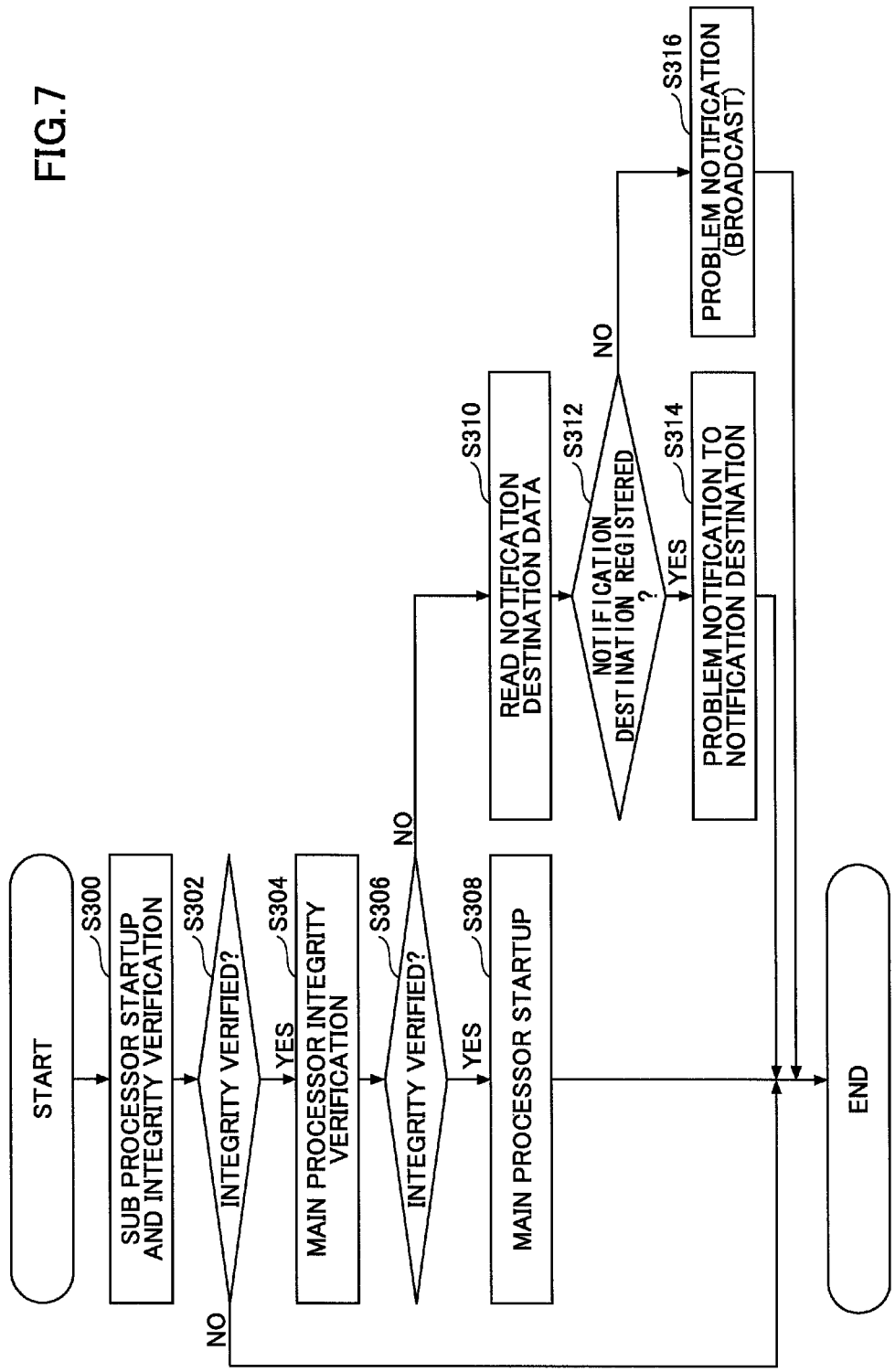
FIG. 7 is a flowchart showing exemplary process steps executed by the sub processor when starting an information processing apparatus according to a third embodiment of the present invention.

FIG. 7 is a flowchart showing exemplary process steps executed by the sub processor 30 when starting the information processing apparatus 3.

First, the sub processor 30 starts up when the startup control unit 30A is started, and the startup control unit 30A instructs the integrity verification unit 30B to perform integrity verification of programs that are to be executed by the sub processor 30 itself (S300). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S302).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S304). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S306).

When the integrity of the programs and data stored in the auxiliary storage device 13 has been verified, the startup control unit 30A sends a signal to a startup control unit (not shown) of the main processor 10 to start the main processor 10 (S308). In this way, the main processor 10 may start performing normal operations.

On the other hand, when the integrity of the programs and data stored in the auxiliary storage device 13 has not been verified, the external communications control unit 30D reads the notification destination data 30E (S310) and determines whether a notification destination is registered in the notification destination data 30E (S312).

If the notification destination is registered in the notification destination data 30E, the external communications control unit 30D sends a verification problem notification to the external apparatus 60 that is registered in the notification destination data 30E as the notification destination (S314).

On the other hand, if no notification destination is registered in the notification destination data 30E, the external communications control unit 30D broadcasts the verification problem notification (S316).

In this way, when the integrity of the programs to be executed by the main processor 10 corresponding to the apparatus controlling processor is not verified, a verification problem notification may be sent to the external apparatus 60 as in the first and second embodiments.

According to an aspect of the present embodiment, when a notification destination is not registered in the notification destination data 30E, a verification problem notification may be broadcast so that reliable notification of the verification problem may be ensured, for example.

Fourth Embodiment

In the following, an information processing apparatus 4 according to a fourth embodiment of the present invention and a method of controlling startup operations of the information processing apparatus 4 are described.

It is noted that hardware components of the information processing apparatus 4 according to the fourth embodiment may be identical to those of the information processing apparatus 1 according to the first embodiment shown in FIG. 1 so that they are given the same reference numerals and their descriptions are omitted.

Also, the functional features of the sub processor 30 when starting the information processing apparatus 4 may be identical to those of the information processing apparatus 2 according to the second embodiment shown in FIG. 4 so that they are given the same reference numerals and their descriptions are omitted. The notification destination data 30E may be stored in the ROM 32 and/or the auxiliary storage device 33 as in the second embodiment, and the notification destination data 30E stored in the auxiliary storage device 33 may be registered and altered by the user of the information processing apparatus 4.

Figure 8:
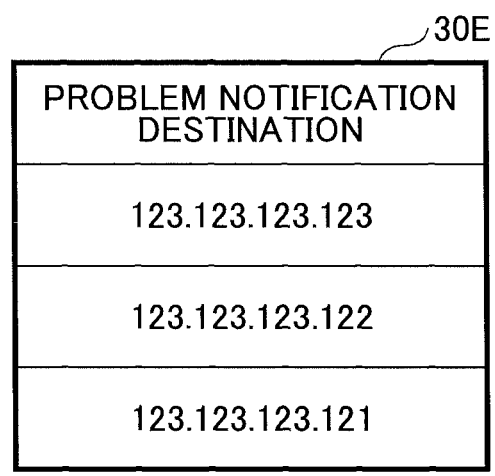
FIG. 8 shows an exemplary data structure of notification destination data used in a fourth embodiment of the present invention.

FIG. 8 shows an exemplary data structure of the notification destination data 30E used in the fourth embodiment. As is shown in FIG. 8, the notification destination data 30E used in the present embodiment may register plural notification destinations.

In the following, process steps for starting the information processing apparatus 4 are described.

Figure 9:
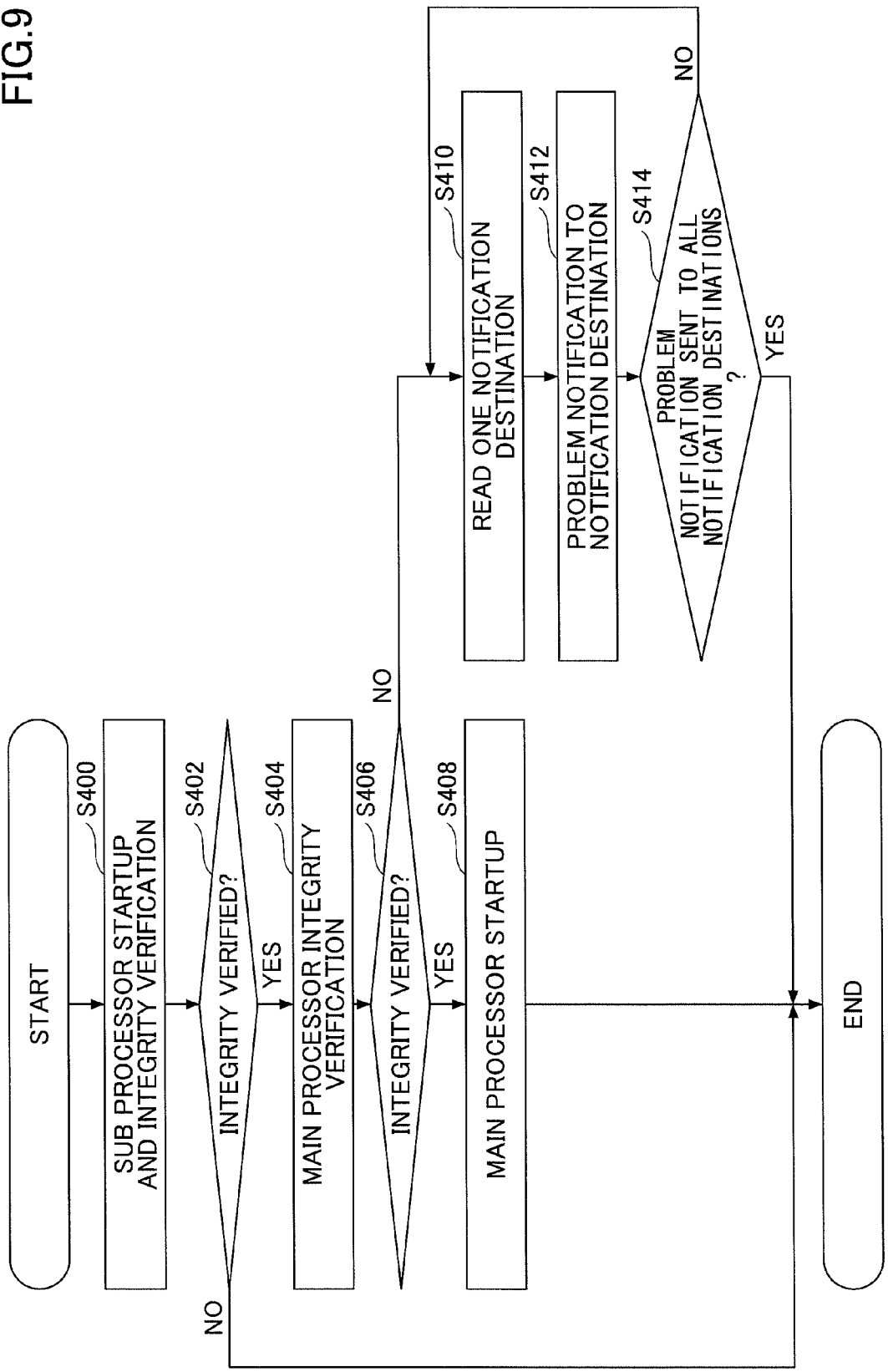
FIG. 9 is a flowchart showing exemplary process steps executed by the sub processor when starting an information processing apparatus according to the fourth embodiment.

FIG. 9 is a flowchart showing exemplary process steps executed by the sub processor 30 when starting the information processing apparatus 4.

First, the sub processor 30 starts up when the startup control unit 30A is started, and the startup control unit 30A instructs the integrity verification unit 30B to perform integrity verification of programs that are to be executed by the sub processor 30 itself (S400). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S402).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S404). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S406).

When the integrity of the programs and data stored in the auxiliary storage device 13 has been verified, the startup control unit 30A sends a signal to a startup control unit (not shown) of the main processor 10 to start the main processor 10 (S408). In this way, the main processor 10 may start performing normal operations.

On the other hand, when the integrity of the programs and data stored in the auxiliary storage device 13 has not been verified, the external communications control unit 30D reads one of the notification destinations registered in the notification destination data 30E (S410) and sends a notification indicating that a verification problem has occurred in the programs to be executed by the main processor 10 to the external apparatus 60 corresponding to the notification destination read from the notification destination data 30E (S412).

Next, the external communications control unit 30D determines whether the verification problem notification has been sent to all the notification destinations registered in the notification destination data 30E (S414).

If the verification problem notification has been sent to all the registered notification destinations, the external communications control unit 30D ends the process. On the other hand, if the verification problem notification has not yet been sent to all the registered notification destinations, the external communications control unit 30D goes back to step S410.

In this way, when the integrity of the programs to be executed by the main processor 10 corresponding to the apparatus controlling processor is not verified, a verification problem notification may be sent to the external apparatus 60 as in the first through third embodiments.

According to an aspect of the present embodiment, plural notification destinations may be registered in the notification destination data 30E and a verification problem notification may be sent to each of the registered notification destinations so that when the user has plural external apparatuses 60 connected to the external network 55, the verification problem of the information processing apparatus 4 may be recognized at any of the external apparatuses 60, for example.

It is noted that in the present embodiment, when no notification destination is registered in the notification destination data 30E, the verification problem notification may be broadcast.

Fifth Embodiment

In the following, an information processing apparatus 5 according to a fifth embodiment of the present invention and a method of controlling startup operations of the information processing apparatus 5 are described.

It is noted that hardware components of the information processing apparatus 5 according to the fifth embodiment may be identical to those of the information processing apparatus 1 according to the first embodiment shown in FIG. 1 so that they are given the same reference numerals and their descriptions are omitted.

Also, functional features of the information processing apparatus 5 that may be identical to those of the information processing apparatuses 1 and 2 are given the same reference numerals.

Figure 10:
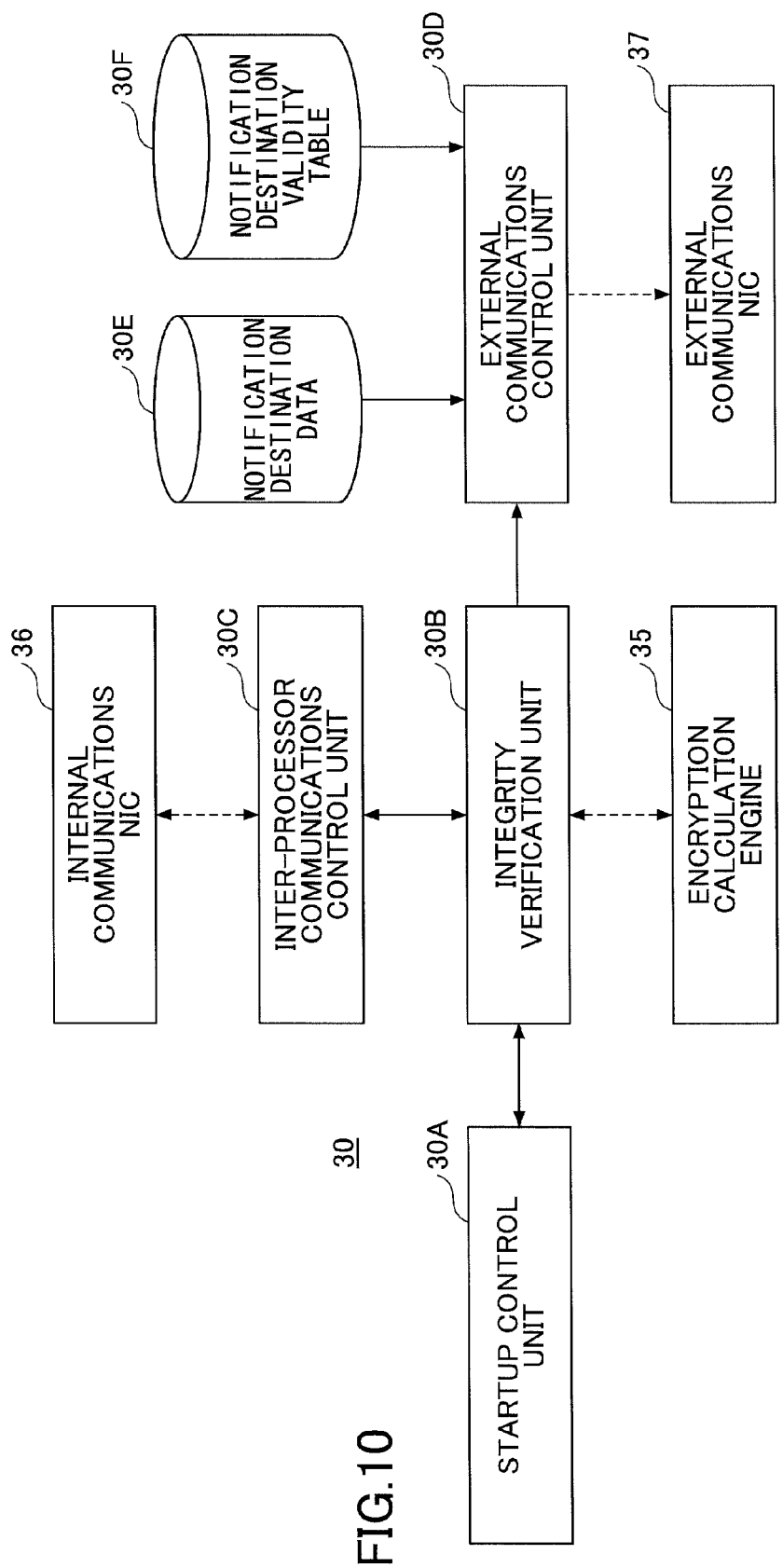
FIG. 10 is a block diagram showing an exemplary functional configuration of the sub processor when starting an information processing apparatus according to a fifth embodiment of the present invention.

FIG. 10 is a block diagram showing an exemplary functional configuration of the sub processor 30 when starting the information processing apparatus 5 (e.g., when the power is turned on or when the system is restarted). As is shown in FIG. 10, the startup control unit 30A including the BIOS, the integrity verification unit 30B, the inter-processor communications control unit 30C, and the external communications control unit 30D are run on the sub processor 30 when starting the information processing apparatus 5. When sending a verification problem notification, the external communications control unit 30D refers to the notification destination data 30E that designates a notification destination to which the verification problem notification should be sent and a notification destination validity table 30F. The notification destination data 30E may be stored in the ROM 32 and/or the auxiliary storage device 33 as in the second embodiment, and the notification destination data 30E stored in the auxiliary storage unit 33 may be registered and altered by the user of the information processing apparatus 5.

FIG. 11 shows an exemplary data structure of the notification destination validity table 30F. The notification destination validity table 30F may be stored in the auxiliary storage device 33, and may be registered and altered by the user of the information processing apparatus 5. In FIG. 11, "YES" indicates that the corresponding notification destination is valid, and "NO" indicates that the corresponding notification destination is invalid.

It is noted that in the present embodiment, plural notification destinations may be registered in the notification destination data 30E as in the fourth embodiment as is shown in FIG. 8.

In the following, process steps for starting the information processing apparatus 5 are described.

Figure 12:
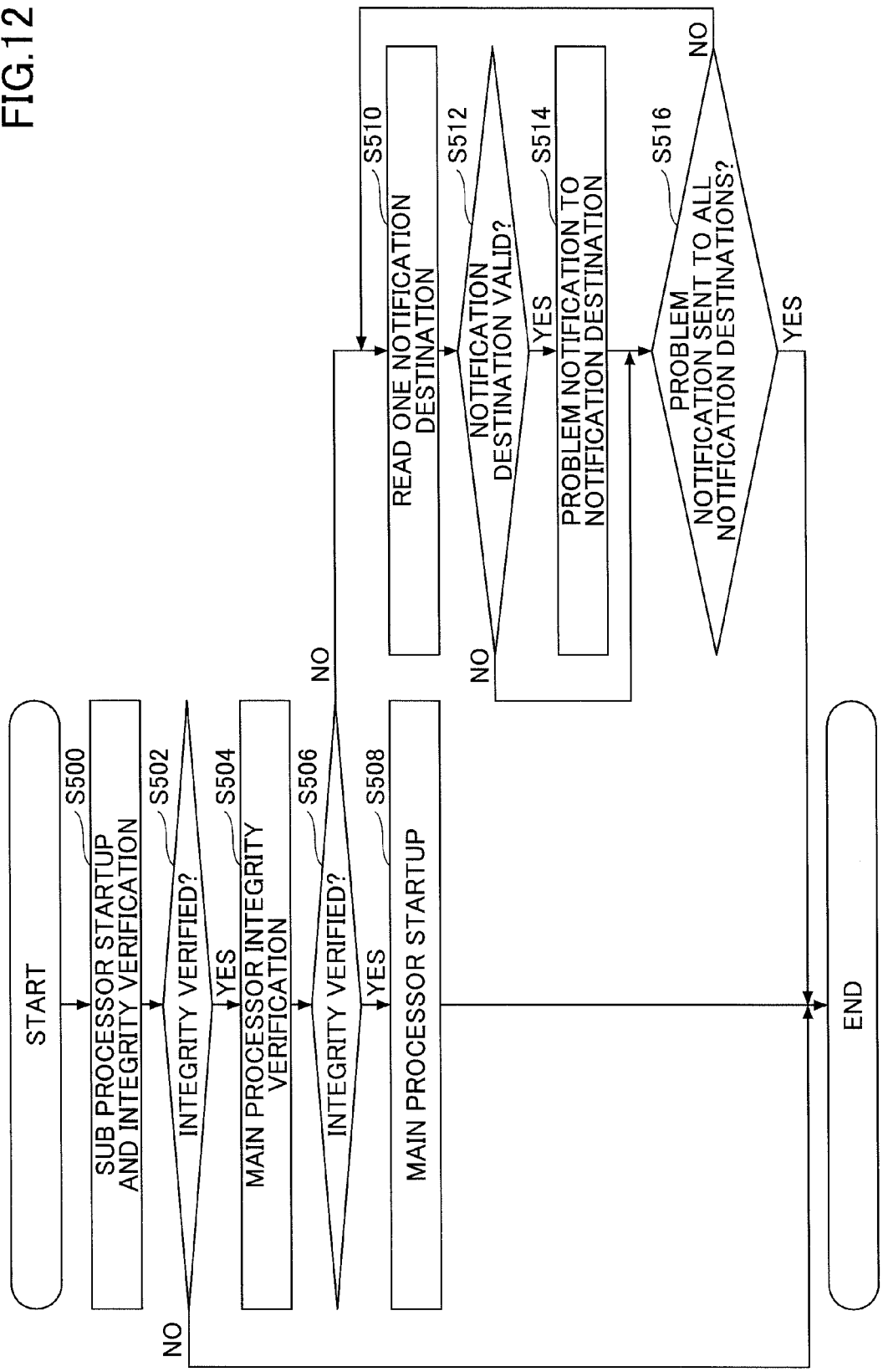
FIG. 12 is a flowchart showing exemplary process steps executed by the sub processor when starting the information processing apparatus of the fifth embodiment.

FIG. 12 is a flowchart showing exemplary process steps executed by the sub processor 30 when starting the information processing apparatus 5.

First, the sub processor 30 starts up when the startup control unit 30A is started, and the startup control unit 30A instructs the integrity verification unit 30B to perform integrity verification of programs that are to be executed by the sub processor 30 itself (S500). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S502).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S504). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S506).

When the integrity of the programs and data stored in the auxiliary storage device 13 has been verified, the startup control unit 30A sends a signal to a startup control unit (not shown) of the main processor 10 to start the main processor 10 (S508). In this way, the main processor 10 may start performing normal operations.

On the other hand, when the integrity of the programs and data stored in the auxiliary storage device 13 has not been verified, the external communications control unit 30D reads one of the notification destinations registered in the notification destination data 30E (S510) and determines whether the notification destination read from the notification destination data 30E is valid (S512). If the notification destination read from the notification destination data 30E is valid, the external communications control unit 30D sends a notification indicating that a verification problem has occurred in the programs to be executed by the main processor 10 to the external apparatus 60 corresponding to the notification destination read from the notification destination data 30E (S514).

Next, the external communications control unit 30D determines whether the verification problem notification has been sent to all the notification destinations registered in the notification destination data 30E (S516).

If the verification problem notification has been sent to all the registered notification destinations, the external communications control unit 30D ends the process. On the other hand, if the verification problem notification has not yet been sent to all the registered notification destinations, the external communications control unit 30D goes back to step S510.

In this way, when the integrity of the programs to be executed by the main processor 10 corresponding to the apparatus controlling processor is not verified, a verification problem notification may be sent to the external apparatus 60 as in the first through fourth embodiments.

According to an aspect of the present embodiment, plural notification destinations may be registered in the notification destination data 30E and the validity of each of the registered notification destinations may be determined so that the user may be relieved from the trouble of registering and deleting plural external apparatuses 60 in the notification destination data 30E, for example. In this way, user-friendliness of the devices connected to the external network 55 may be improved, for example.

It is noted that in the present embodiment, when no notification destination is registered in the notification destination data 30E or when all of the registered communications destinations are invalid, the verification problem notification may be broadcast.

Sixth Embodiment

In the following, an information processing apparatus 6 according to a sixth embodiment of the present invention and a method of controlling startup operations of the information processing apparatus 6 are described.

Figure 13:
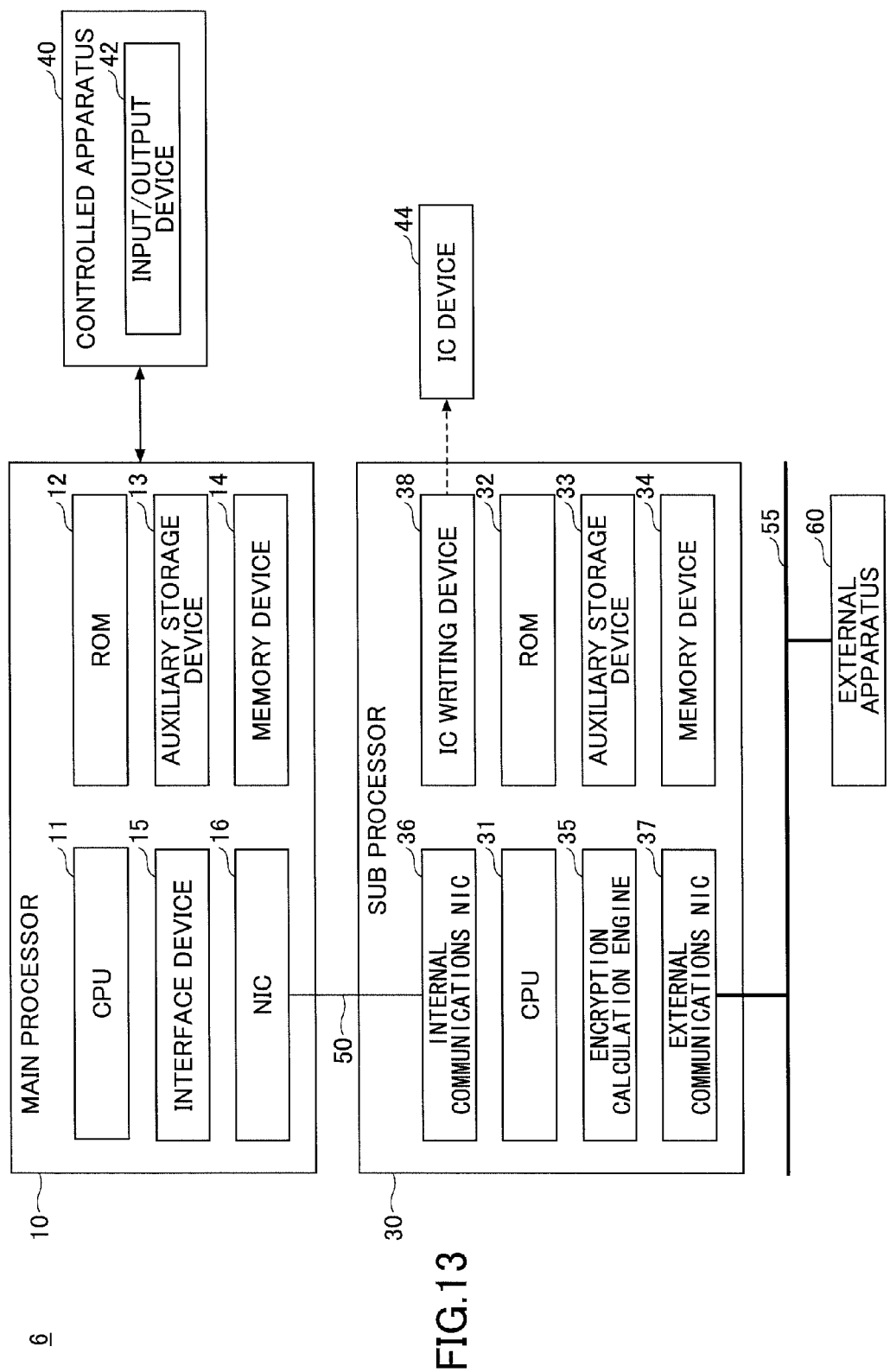
FIG. 13 is a block diagram showing an exemplary hardware configuration of an information processing apparatus 6 according to a sixth embodiment of the present invention.

FIG. 13 is a block diagram showing an exemplary hardware configuration of the information processing apparatus 6 according to the sixth embodiment. It is noted that hardware components of the information processing apparatus 6 that may be identical to those of the information processing apparatus 1 according to the first embodiment shown in FIG. 1 are given the same reference numerals and their descriptions are omitted. The information processing apparatus 6 includes an IC (Integrated Circuit) writing device 38 in addition to the hardware components shown in FIG. 1.

The IC writing device 38 may include a transmitting and receiving antenna, for example, and is configured to write predetermined information on a noncontact IC device 44 that comes close to the information processing apparatus 6. The IC device 44 may be an IC card or a portable terminal having an IC receiving function, for example.

Figure 14:
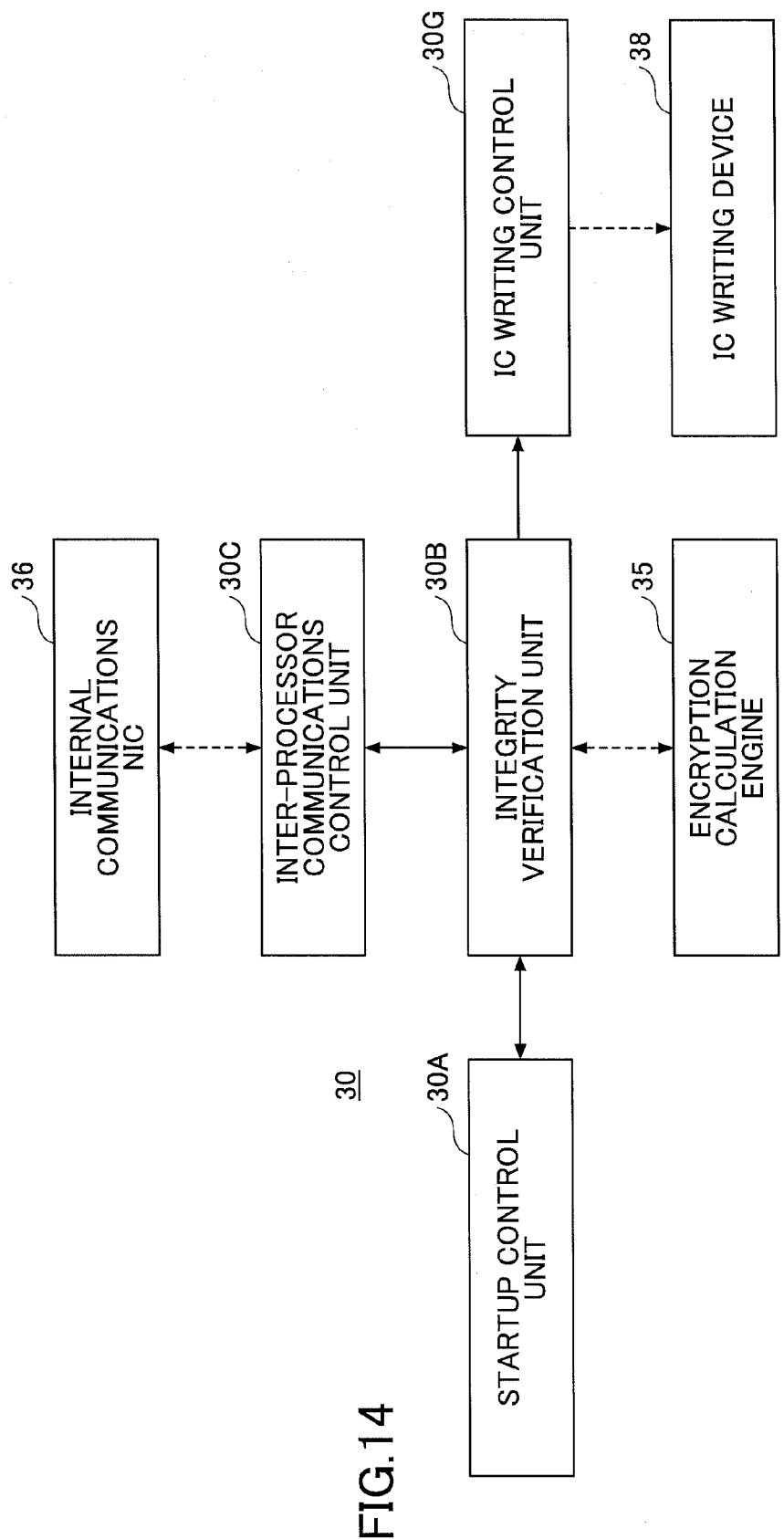
FIG. 14 is a block diagram showing an exemplary functional configuration of the sub processor when starting the information processing apparatus of the sixth embodiment.

FIG. 14 is a block diagram showing an exemplary functional configuration of the sub processor 30 when starting the information processing apparatus 6 (e.g., when the power is turned on or when the system is restarted). As is shown in FIG. 14, the startup control unit 30A including the BIOS, the integrity verification unit 30B, the inter-processor communications control unit 30C, and an IC writing control unit 30G are run on the sub processor 30 when starting the information processing apparatus 6.

In the following, process steps for starting the information processing apparatus 6 are described.

Figure 15:
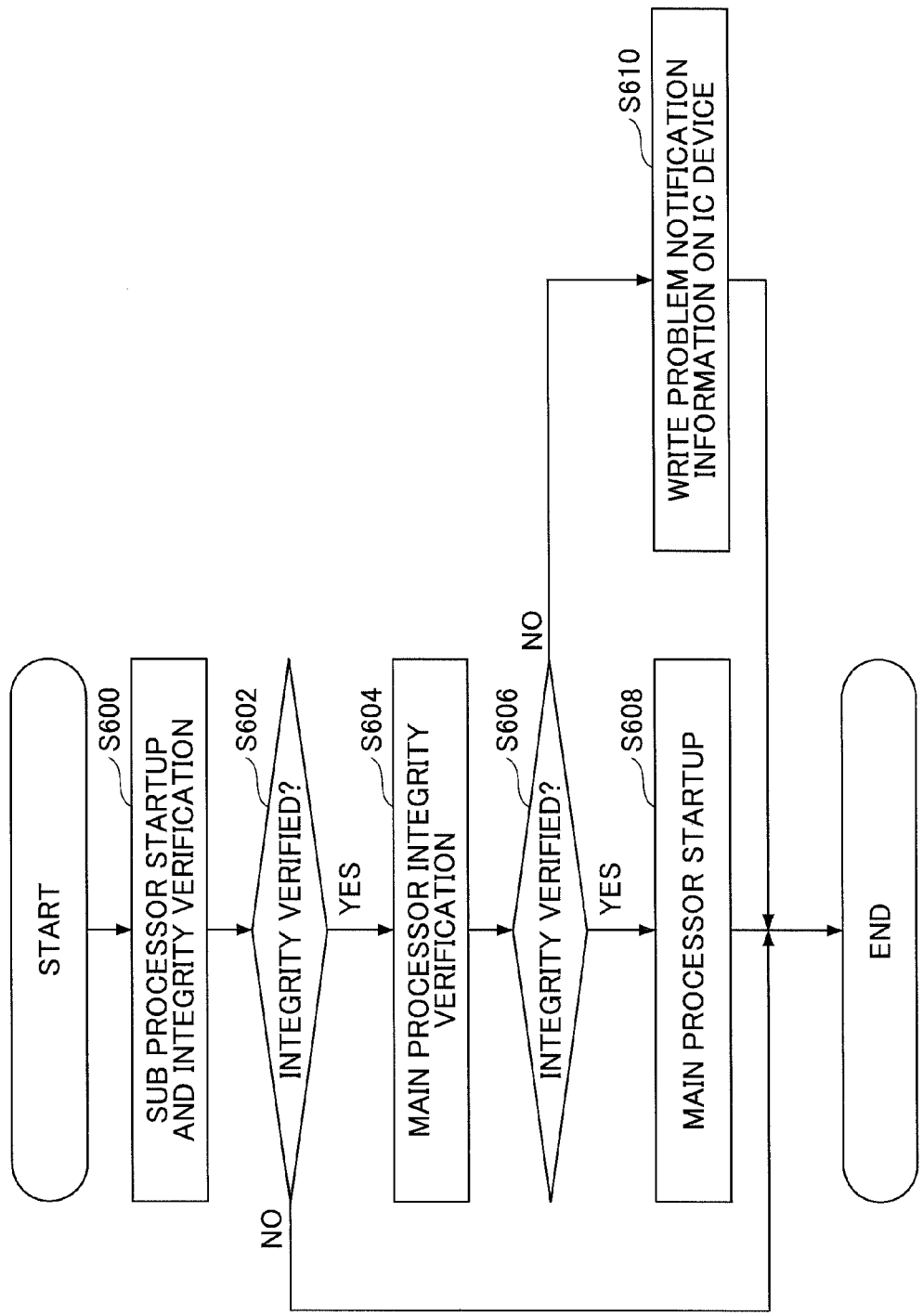
FIG. 15 is a flowchart showing exemplary process steps executed by the sub processor when starting the information processing apparatus of the sixth embodiment.

FIG. 15 is a flowchart showing exemplary process steps executed by the sub processor 30 when starting the information processing apparatus 6.

First, the sub processor 30 starts up when the startup control unit 30A is started, and the startup control unit 30A instructs the integrity verification unit 30B to perform integrity verification of programs that are to be executed by the sub processor 30 itself (S600). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S602).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S604). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S606).

When the integrity of the programs and data stored in the auxiliary storage device 13 has been verified, the startup control unit 30A sends a signal to a startup control unit (not shown) of the main processor 10 to start the main processor 10 (S608). In this way, the main processor 10 may start performing normal operations.

On the other hand, when the integrity of the programs and data stored in the auxiliary storage device 13 has not been verified, the IC writing control unit 30G instructs the IC writing device 38 to write information indicating that a verification problem has occurred in the programs to be executed by the main processor 10 in the IC device 44 (S610).

In this way, when the integrity of the programs to be executed by the main processor 10 corresponding to the apparatus controlling processor is not verified, information relating to the verification problem may be written in the IC device 44 in a reliable manner, for example.

In the information processing apparatus 6, when outputting information relating to the verification problem, the IC writing device 38 is used rather than using a device connected to the main processor 10.

In this way, information relating to the verification problem may be written in the IC device 44 more reliably compared to a case in which the main processor 10 controls the verification problem notification. That is, when a program for conveying a notification of a verification problem is to be executed by the main processor 10, the program may be disabled when a verification problem occurs and notification of the verification problem may be impossible.

Also, the sub processor 30 does not need to understand device details such as the configuration and/or the IP address of the controlled apparatus 40, which is connected to the main processor 10, so that the sub processor 30 may accommodate main processors 10 of various specifications. In this way, apparatus compatibility may be improved, for example.

It is noted that in the present embodiment, a verification problem notification may be made even in an environment outside the communication environment of the external network 55, for example.

According to an aspect of the present embodiment, when the integrity of the programs to be executed by the main processor 10 corresponding to the apparatus controlling processor is not verified, information relating to the verification problem may be reliably written in the IC device 44.

Seventh Embodiment

In the following, an information processing apparatus 7 according to a seventh embodiment of the present invention and a method of controlling startup operations of the information processing apparatus 7 are described.

Figure 16:
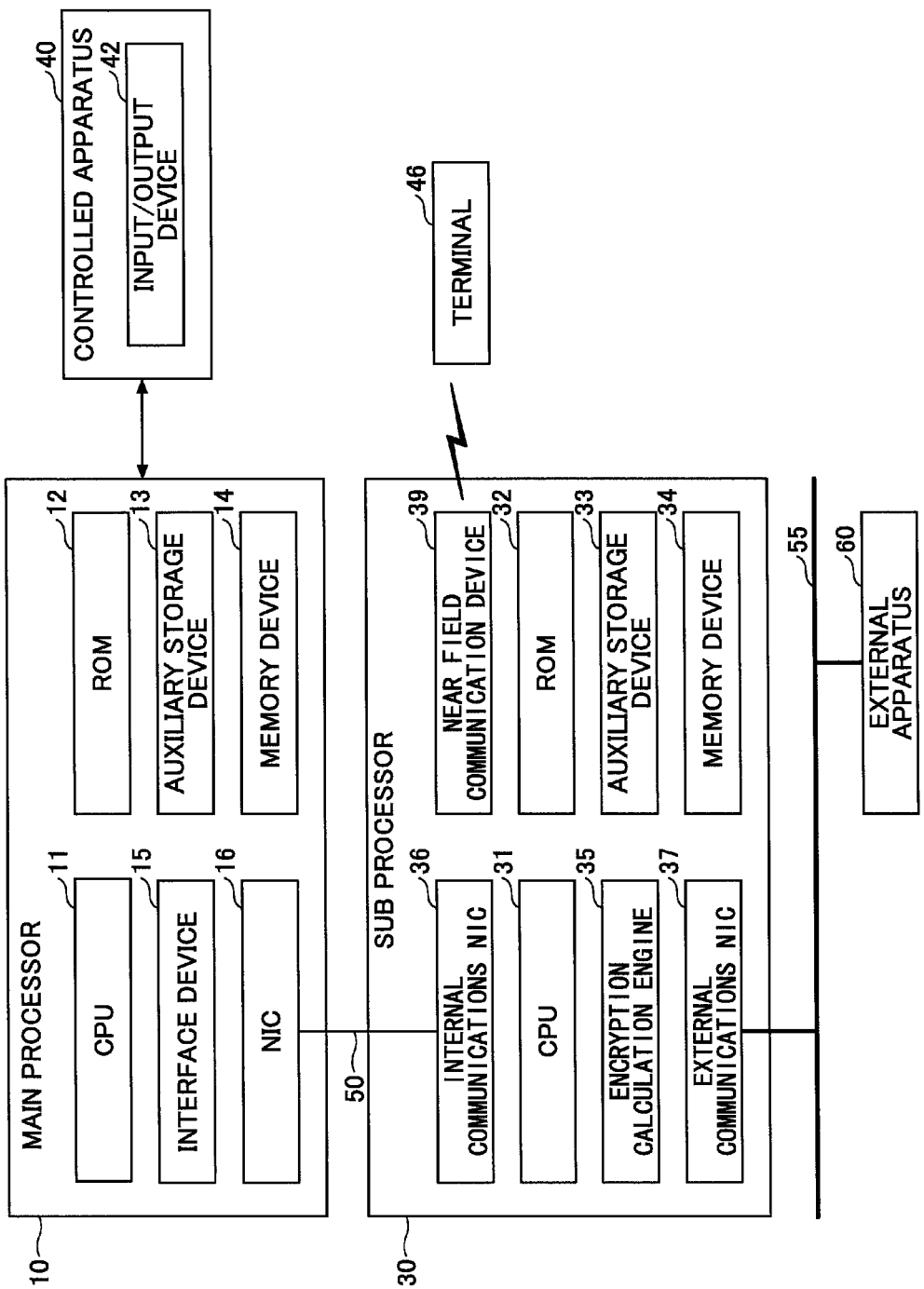
FIG. 16 is a block diagram showing an exemplary hardware configuration of an information processing apparatus according to a seventh embodiment of the present invention.

FIG. 16 is a block diagram showing an exemplary hardware configuration of the information processing apparatus 7 according to the seventh embodiment. It is noted that hardware components of the information processing apparatus 7 that may be identical to those of the information processing apparatus 1 according to the first embodiment shown in FIG. 1 are given the same reference numerals and their descriptions are omitted. The information processing apparatus 7 includes a near field communication device 39 in addition to the hardware components shown in FIG. 1.

The near field communication device 39 may include a transmitting and receiving antenna, for example, and is configured to exchange information with a terminal 46 residing near the information processing apparatus 7. The near field communication device 39 may exchange information with the terminal 46 using a communication mode such as DSRC (Dedicated Short Range Communications), Bluetooth (registered trademark), or infrared communications. The terminal 46 may be a cell phone, a PDA (Personal Digital Assistant), or some other type of terminal such as a personal computer.

Figure 17:
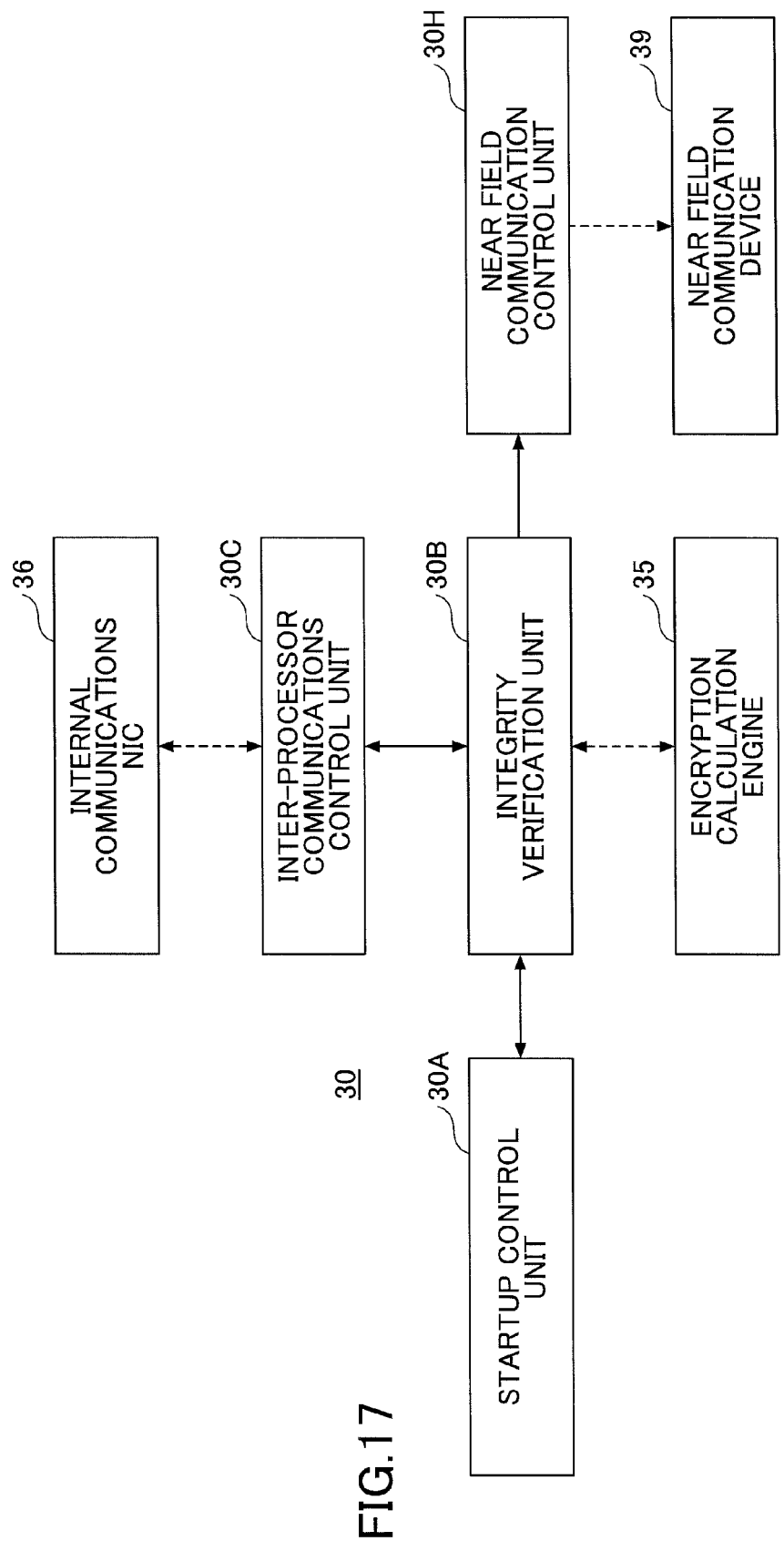
FIG. 17 is a block diagram showing an exemplary functional configuration of the sub processor when starting the information processing apparatus of the seventh embodiment.

FIG. 17 is a block diagram showing an exemplary functional configuration of the sub processor 30 when starting the information processing apparatus 7 (e.g., when the power is turned on or when the system is restarted). As is shown in FIG. 17, the startup control unit 30A including the BIOS, the integrity verification unit 30B, the inter-processor communications control unit 30C, and a near field communication control unit 30H are run on the sub processor 30 when starting the information processing apparatus 7.

In the following, process steps for starting the information processing apparatus 7 are described.

Figure 18:
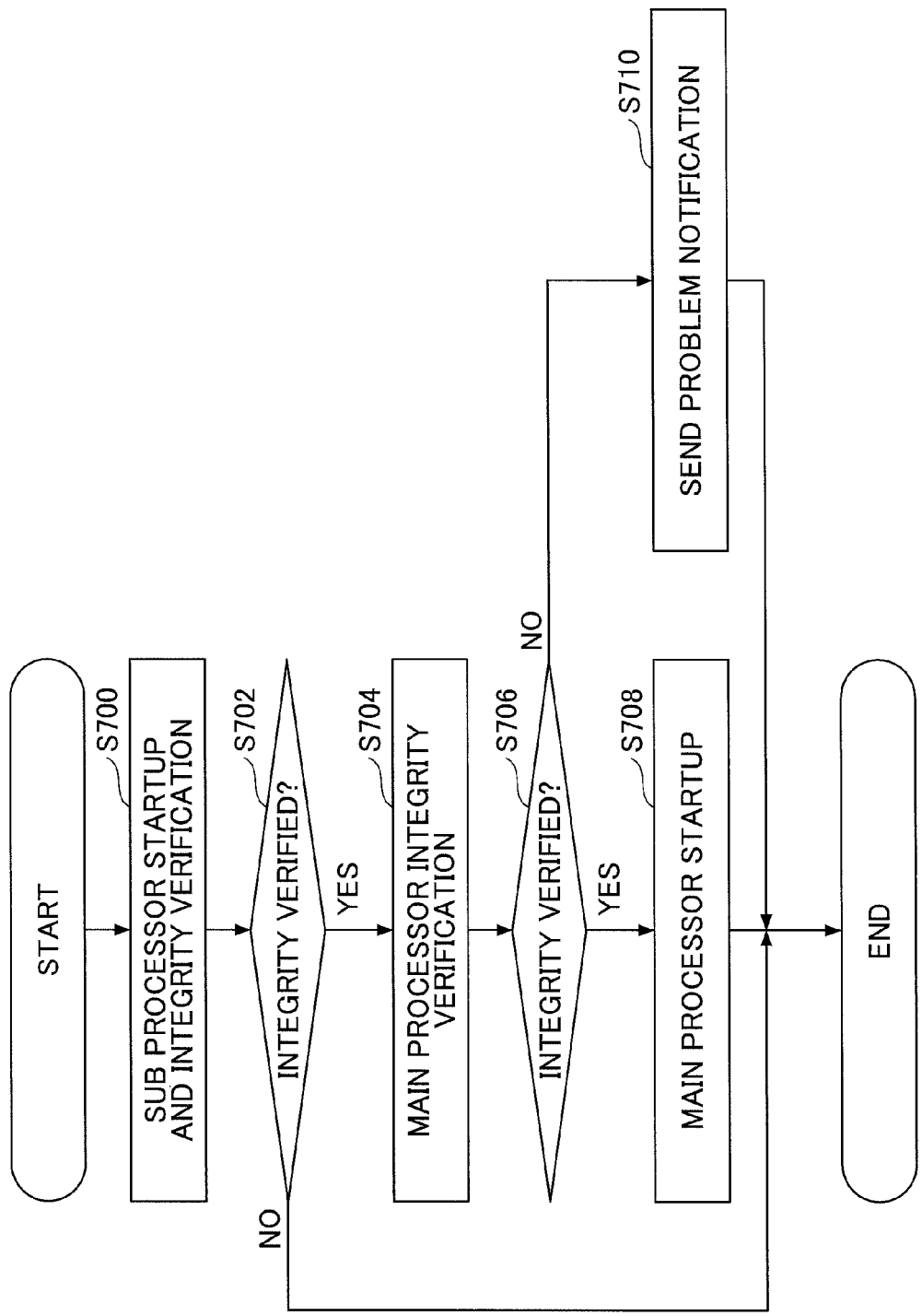
FIG. 18 is a flowchart showing exemplary process steps executed by the sub processor when starting the information processing apparatus of the seventh embodiment.

FIG. 18 is a flowchart showing exemplary process steps executed by the sub processor 30 when starting the information processing apparatus 7.

First, the sub processor 30 starts up when the startup control unit 30A is started, and the startup control unit 30A instructs the integrity verification unit 30B to perform integrity verification of programs that are to be executed by the sub processor 30 itself (S700). The integrity verification unit 30B instructs the encryption calculation engine 35 to perform integrity verification of programs and data (if necessary) that are stored in the auxiliary storage unit 33. It is noted that conventionally known methods may be used to perform the integrity verification so that their descriptions are omitted. For example, signature verification using an electronic signature may be used to realize the integrity verification.

Next, the startup control unit 30A determines whether the integrity of the programs and data stored in the auxiliary storage device 33 has been verified (S702).

When the integrity of the programs and data stored in the auxiliary storage device 33 has not been verified, the startup control unit 30A ends the process.

On the other hand, when the integrity of the programs and data stored in the auxiliary storage device 33 has been verified, the startup control unit 30A instructs the integrity verification unit 30B to perform integrity verification of programs that are to be executed by the main processor 10 (S704). The integrity verification unit 30B instructs the inter-processor communications control unit 30C to obtain programs and data stored in the auxiliary storage device 13 and instructs the encryption calculation engine 35 to perform integrity verification of the programs and data obtained from the auxiliary storage device 13.

Next, the startup control unit 30A determines whether the integrity of the programs and data stored in the auxiliary storage device 13 has been verified (S706).

When the integrity of the programs and data stored in the auxiliary storage device 13 has been verified, the startup control unit 30A sends a signal to a startup control unit (not shown) of the main processor 10 to start the main processor 10 (S708). In this way, the main processor 10 may start performing normal operations.

On the other hand, when the integrity of the programs and data stored in the auxiliary storage device 13 has not been verified, the near field communication control unit 30G instructs the near field communication device 39 to send information to the terminal 46 indicating that a verification problem has occurred in the programs to be executed by the main processor 10 (S710).

In this way, when the integrity of the programs to be executed by the main processor 10 corresponding to the apparatus controlling processor is not verified, information indicating that a verification problem has occurred in the programs to be executed by the main processor may be reliably sent to the terminal 46, for example.

In the information processing apparatus 7, when outputting information relating to the verification problem, the near field communication device 39 is used rather than using a device connected to the main processor 10.

In this way, the information indicating the occurrence of a verification problem may be sent to the terminal 46 more reliably compared to a case in which the main processor 10 controls the verification problem notification. That is, when a program for conveying a notification of a verification problem is to be executed by the main processor 10, the program may be disabled when a verification problem occurs and notification of the verification problem may be impossible.

Also, the sub processor 30 does not need to understand device details such as the configuration and/or the IP address of the controlled apparatus 40, which is connected to the main processor 10, so that the sub processor 30 may accommodate main processors 10 of various specifications. In this way, apparatus compatibility may be improved, for example.

It is noted that in the present embodiment, a verification problem notification may be made even in an environment outside the communication environment of the external network 55, for example.

According to an aspect of the present embodiment, when the integrity of the programs to be executed by the main processor 10 corresponding to the apparatus controlling processor is not verified, information relating to the verification problem may be reliably sent to the terminal 46.

Modified Embodiment

In a modified embodiment of the present invention, the notification destination data 30E and/or the notification destination validity table 30F used in the fourth and fifth embodiments may be configured to register other output means for conveying the verification problem notification such as writing on the IC device 44 by the IC writing device 38 and/or near field communication with the terminal 46 by the near field communication device 39. That is, in this modified embodiment, the notification destination as well as other output means for conveying the verification problem notification may be registered.

FIG. 19 shows an exemplary data structure of the notification destination validity table 30F that registers information on the validity of other output means such as writing on the IC device 44 by the IC writing device 38 and near field communication with the terminal 46 by the near field communication device 39.

Further, the present invention is not limited to these embodiments, and numerous variations and modifications may be made without departing from the scope of the present invention.

The present application is based on and claims the benefit of the priority date of Japanese Patent Application No. 2011-262968 filed on Nov. 30, 2011, with the Japanese Patent Office, the entire contents of which are hereby incorporated by reference.

What is claimed is:

1. An information processing apparatus comprising:
a first processor configured to be connected to an input/output device and execute a first computer-readable program for controlling an apparatus including the input/output device, the first processor having an interface device; and
a second processor configured to be connected to an external network and execute a second computer-readable program for communicating with an external apparatus via the external network, the second processor including at least a near field communication device, wherein
upon starting the information processing apparatus, the second processor is configured to,
verify an integrity of the second computer-readable program before verifying an integrity of the first computer-readable program,
start the first processor when the integrity of the second computer-readable program and the first computer-readable program are verified; and
when the integrity of the second computer-readable program and the first computer-readable program to be executed by the first processor are not verified, the second processor is configured to issue a problem notification without using the interface device of the first processor, and
when the integrity of the first computer-readable program to be executed by the first processor is not verified, the near field communication device is configured to send the problem notification indicating that a verification problem has occurred in the first computer-readable program to be executed by the first processor.

2. The information processing apparatus as claimed in claim 1, wherein
when the integrity of the first computer-readable program to be executed by the first processor is not verified, the near field communication device is configured to send the problem notification to the external apparatus via the external network.

3. The information processing apparatus as claimed in claim 1, wherein
the second processor includes a storage unit configured to store notification destination data designating a notification destination, and
the near field communication device is configured to send the problem notification to the notification destination designated by the notification destination data.

4. The information processing apparatus as claimed in claim 3, wherein
the notification destination data is configured to be registered by a user; and
when the notification destination data designating the notification destination is not registered, the second processor is configured to broadcast the problem notification.

5. The information processing apparatus as claimed in claim 3, wherein
the storage unit of the second processor is configured to store plural notification destinations as the notification destination data; and
the near field communication device is configured to send the problem notification to the notification destinations designated by the notification destination data.

6. The information processing apparatus as claimed in claim 3, wherein
the storage unit of the second processor is configured to store,
plural notification destinations as the notification destination data, and
validity data that indicates whether the notification destinations are valid and is configured to be registered by a user; and
the near field communication device is configured to send the problem notification to the notification destination that is indicated as valid by the validity data.

7. The information processing apparatus as claimed in claim 1, wherein
the second processor includes a writing device that is configured to write data in an integrated circuit (IC) device; and
when the integrity of the program to be executed by the first processor is not verified, the writing device is configured to write the problem notification in the IC device.

8. An information processing apparatus comprising:
a first processor configured to be connected to an apparatus and execute a first computer-readable program for controlling the apparatus, the first processor including an interface device; and
a second processor that is configured to execute a second computer-readable program for communicating with an external apparatus, the second processor including at least a near field communication device, wherein
upon starting the information processing apparatus, the second processor is configured to,
verify an integrity of the second computer-readable program before verifying an integrity of the first computer-readable program,
start the first processor when the integrity of the second computer-readable program and the first computer-readable program are verified, and
when the integrity of the second computer-readable program and the first computer-readable program to be executed by the first processor are not verified, the second processor is configured to issue a problem notification without using the interface device of the first processor, and
when the integrity of the first computer-readable program to be executed by the first processor is not verified, the near field communication device is configured to send the problem notification indicating that a verification problem has occurred in the first computer-readable program to be executed by the first processor.

9. A method of controlling startup operations of an information processing apparatus including a first processor that is connected to an input/output device and includes an interface device, the first processor being configured to execute a first computer-readable program for controlling an apparatus including the input/output device and a second processor that is connected to an external apparatus via an external network and is configured to execute a second computer-readable program for establishing communication via the external network, the second processor including at least a near field communication device, the method comprising:
verifying, by the second processor, an integrity of the second computer-readable program before verifying an integrity of the first computer-readable program to be executed by the first processor;
starting the first processor, by the second processor, when the verifying verifies the integrity of the second computer-readable program and the first computer-readable program;
issuing, by the second processor, a problem notification without using the interface device of the first processor, when the integrity of the second computer-readable program and the first computer-readable program to be executed by the first processor are not verified; and
when the integrity of the first computer-readable program to be executed by the first processor is not verified, directing the near field communication device to send the problem notification indicating that a verification problem has occurred in the first computer-readable program to be executed by the first processor.

* * * * *